(12) United States Patent
Fey

(10) Patent No.: US 11,085,348 B2
(45) Date of Patent: Aug. 10, 2021

(54) METHOD AND CONTROL DEVICE FOR CONTROLLING A FILL LEVEL OF A STORAGE DEVICE OF A CATALYTIC CONVERTER FOR AN EXHAUST GAS COMPONENT WHEN THE PROBE IS NOT READY FOR OPERATION

(71) Applicant: Robert Bosch GmbH, Stuttgart (DE)

(72) Inventor: Michael Fey, Wiernsheim (DE)

(73) Assignee: Robert Bosch GmbH, Stuttgart (DE)

( * ) Notice: Subject to any disclaimer, the term of this patent is extended or adjusted under 35 U.S.C. 154(b) by 25 days.

(21) Appl. No.: 16/722,502

(22) Filed: Dec. 20, 2019

(65) Prior Publication Data
US 2020/0347769 A1    Nov. 5, 2020

(30) Foreign Application Priority Data
Dec. 27, 2018   (DE) ........................ 102018251719.3

(51) Int. Cl.
*F01N 3/10*     (2006.01)
*F01N 9/00*     (2006.01)

(52) U.S. Cl.
CPC .............. *F01N 9/00* (2013.01); *F01N 3/101* (2013.01); *F01N 2900/04* (2013.01); *F01N 2900/1402* (2013.01); *F01N 2900/1624* (2013.01)

(58) Field of Classification Search
CPC ........ F01N 9/00; F01N 3/101; F01N 2900/04; F01N 2900/1402; F01N 2900/1624; F01N 2900/0416; F02D 41/0295; F02D 41/1454
See application file for complete search history.

(56) References Cited

U.S. PATENT DOCUMENTS 4,707,984 A * 11/1987 Katsuno .............. F02D 41/1439
                                                                 123/689
9,771,888 B2 * 9/2017 Packard .............. F02D 41/0235
(Continued)

FOREIGN PATENT DOCUMENTS

EP            3451023          3/2019

*Primary Examiner* — Matthew T Largi
(74) *Attorney, Agent, or Firm* — Norton Rose Fulbright US LLP; Gerard Messina

(57) ABSTRACT

A method for controlling a filling of an exhaust-gas component storage-device of a catalytic-converter in the exhaust-gas of an internal-combustion-engine, in which an actual fill level ($\bar{\theta}_{mod}$) of the exhaust-gas component storage-device is ascertained using a first-system model to which signals ($\lambda_{in,meas}$) of a first-exhaust-gas probe that extends into the exhaust-gas flow upstream from the catalytic-converter and that acquires a concentration of the exhaust-gas component are supplied, if this first exhaust-gas probe is ready for operation. A lambda-target-value ($\lambda_{in,set}$) for a first control-loop is specified by a lambda-target-value pilot control, and that, if the first exhaust-gas probe is not ready for operation, a replacement signal for the signal of the first exhaust-gas probe is supplied to the system-model, and the replacement signal is used in the lambda-target-value pilot control as an initial-value for the lambda-target-value. Also described is a control device for the method.

12 Claims, 3 Drawing Sheets

(56) References Cited

U.S. PATENT DOCUMENTS

| | | | |
|---|---|---|---|
| 2002/0178714 A1* | 12/2002 | Shi ...................... | F02D 41/1441 |
| | | | 60/285 |
| 2008/0276920 A1* | 11/2008 | Iwachido .............. | F02D 41/025 |
| | | | 123/703 |
| 2011/0005207 A1* | 1/2011 | Akihisa .................. | F02D 15/04 |
| | | | 60/286 |
| 2011/0220084 A1* | 9/2011 | Burak ................... | F02D 41/064 |
| | | | 123/703 |
| 2018/0048811 A1 | 2/2018 | Waller et al. | |
| 2020/0347793 A1* | 11/2020 | Wagner ............... | F02D 41/1445 |

* cited by examiner

METHOD AND CONTROL DEVICE FOR CONTROLLING A FILL LEVEL OF A STORAGE DEVICE OF A CATALYTIC CONVERTER FOR AN EXHAUST GAS COMPONENT WHEN THE PROBE IS NOT READY FOR OPERATION

RELATED APPLICATION INFORMATION

The present application claims priority to and the benefit of German patent application no. 10 2018 251 719.3, which was filed in Germany on Dec. 27, 2018, the disclosure which is incorporated herein by reference.

FIELD OF THE INVENTION

The present invention relates to a method for controlling a fill level of an exhaust gas component storage device of a catalytic converter in the exhaust gas of an internal combustion engine. In its device aspects, the present invention relates to a control device.

BACKGROUND INFORMATION

A method and a control device for oxygen as exhaust gas component are discussed in DE 103 39 063 A1. In the method and control device, an actual fill level of the exhaust gas component storage device is ascertained using a first system model to which signals of a first exhaust gas probe, which extends into the exhaust gas flow upstream in terms of flow from the catalytic converter and acquires a concentration of the exhaust gas component, are supplied when this probe is ready for operation.

When there is an incomplete combustion of the air-fuel mixture in a spark-ignition engine, in addition to nitrogen ($N_2$), carbon dioxide ($CO_2$), and water ($H_2O$) a large number of combustion products are ejected, of which hydrocarbons (HC), carbon monoxide (CO), and nitrogen oxides ($NO_x$) are limited by law. According to the existing art, the exhaust gas limit values currently in force for motor vehicles can be adhered to only with the use of a catalytic post-treatment of the exhaust gas.

Through the use of a three-way catalytic converter, the named pollutant components can be converted.

In three-way catalytic converters, a simultaneously high conversion rate for HC, CO, and $NO_x$ is achieved only in a narrow lambda range around the stoichiometric operating point (lambda=1), the so-called catalytic converter window.

In order to operate the three-way catalytic converter in the catalytic converter window, in today's engine control systems a lambda control is typically used that is based on the signals from lambda probes situated before and after the three-way catalytic converter. For controlling the air ratio lambda, which is a measure of the composition of the fuel/air ratio of the internal combustion engine, the oxygen content of the exhaust gas before the three-way catalytic converter is measured using a front exhaust gas probe situated there. As a function of this measurement value, the control system corrects the fuel quantity or injection pulse width, specified in the form of a base value of a pre-controlling function.

In the context of this pre-controlling, base values of fuel quantities to be injected are specified as a function of, for example, the rotational speed and load of the internal combustion engine. For a still more precise control, in addition the oxygen concentration of the exhaust gas downstream from the three-way catalytic converter is acquired using a further exhaust gas probe. The signal of this rear exhaust gas probe is used for a reference control that is superposed on the lambda control, based on the signal of the front exhaust gas probe, before the three-way catalytic converter. As a rule, as the exhaust gas probe situated after the three-way catalytic converter a two-step lambda probe is used that has a very steep characteristic curve when lambda=1, and can therefore indicate lambda=1 very accurately (*Kraftfahrtechnisches Taschenbuch* (*Automotive Handbook*), 23rd ed., p. 524).

In addition to the reference control, which in general adjusts only small deviations from lambda=1 and is configured to be comparatively slow, in current engine control systems as a rule there is a functionality that after large deviations from lambda=1 ensures, in the form of a lambda pre-controlling, that the catalytic converter window is quickly reached again, which is important for example after phases that include a shutoff of overrun operation, in which the three-way catalytic converter is charged with oxygen. This impairs the $NO_x$ conversion.

Due to the oxygen storage capacity of the three-way catalytic converter, lambda=1 may still be the case for several seconds after the three-way catalytic converter, after a rich or lean lambda has been set before the three-way catalytic converter. This property of the three-way catalytic converter of temporarily storing oxygen is used to compensate brief deviations from lambda=1 before the three-way catalytic converter. If lambda not equal to 1 is the case before the three-way catalytic converter for a longer period of time, then the same lambda will also arise after the three-way catalytic converter as soon as the oxygen fill level, given lambda>1 (excess oxygen), exceeds the oxygen storage capacity, or as soon as, given lambda<1, oxygen is no longer stored in the three-way catalytic converter.

At that time, a two-step lambda probe after the three-way catalytic converter also indicates a departure from the catalytic converter window. Up to this time, the signal of the lambda probe after the three-way catalytic converter does not, however, indicate the impending breakdown, and a reference control based on this signal will therefore often react so late that the fuel metering system can no longer react in good time before a breakdown. As a consequence, increased tailpipe emissions occur. Current control configurations therefore have the disadvantage of late recognition of a departure from the catalytic converter window on the basis of the voltage of the two-step lambda probe after the three-way catalytic converter.

An alternative to control on the basis of the signal of a lambda probe after the three-way catalytic converter is a control of the average oxygen fill level of the three-way catalytic converter. This average fill level is not measurable, but can be modeled by calculations according to DE 103 39 063 A1, cited above.

However, a three-way catalytic converter is a complex, nonlinear system having time-variant system parameters. In addition, the measured or modeled input variables for a model of the three-way catalytic converter are standardly subject to uncertainty. Therefore, a generally valid catalytic converter model that is capable of describing with sufficient accuracy the behavior of the three-way catalytic converter in various operating states (e.g. at different engine operating points, or at different catalytic converter age levels) is generally not available in an engine controlling system.

SUMMARY OF THE INVENTION

The present invention differs from this existing art through the features described herein.

In the present invention, a target lambda value for a first control loop is specified by a lambda target value pre-controlling, and if the first exhaust gas probe is not operationally ready a replacement signal for the signal of the first exhaust gas probe is supplied to the system model, and the replacement signal is used in the lambda target value pre-controlling as the initial value for the lambda target value.

The control of the fill level of the three-way catalytic converter based on the signal of an exhaust gas probe situated before the three-way catalytic converter has the advantage that an impending departure from the catalytic converter window can be recognized earlier than in the case of a reference control that is based on the signal of an exhaust gas probe situated after the three-way catalytic converter, so that the departure from the catalytic converter window can be counteracted by a timely, targeted correction of the air-fuel mixture.

In this context, after the start of the internal combustion engine and in the case of an error of the first exhaust gas probe the present invention enables a further improved pilot control, or control of an oxygen quantity stored in the catalytic converter volume, by which a departure from the catalytic converter window can be recognized in good time and prevented. Through the present invention, the pilot control and control of the fill level is activated at the earliest possible appropriate time. The activation takes place in particular before operational readiness has been reached of those exhaust gas probes that are not necessarily required for the pilot control and control. Immediately after a cold start, the exhaust gas probes are not yet ready for operation, because in order to function they must have a minimum temperature that is not yet present in the case of a cold start. Similar considerations hold for catalytic converters. However, catalytic converters as a rule reach their operational temperature earlier than the exhaust gas probes do, and are therefore able to convert pollutants in the exhaust gas in good time if the exhaust gas has an appropriate composition. The earliest possible appropriate time for the beginning of the fill control is therefore, for example, the time at which the catalytic converter reaches the temperature at which it is ready for operation. Through the activation, supported by a replacement signal for the signal of the first exhaust gas probe, of the pre-controlling of a model-based control of the filling in particular of a three-way catalytic converter before the first exhaust gas probe has reached operational readiness, the present invention enables the setting of the filling of the catalytic converter.

Even if the accuracy of the pre-controlling with the replacement signal is, as a rule, not as high as with the signal of a first exhaust gas probe ready for operation, the catalytic converter can be better operated in the active catalytic converter window than is the case without an activated pre-controlling. In this way, an effective exhaust gas cleaning is initiated earlier than in the existing art, which requires operational readiness of the front exhaust gas probe as a precondition. In this way, the tailpipe emissions can be reduced after the start of the internal combustion engine and in the case of errors of the first exhaust gas probe. In addition, the present invention at the same time offers a better balanced fill level reserve than do existing control configurations, which has an advantageous effect in the case of dynamic disturbances. In this way, emissions can be reduced. Stricter legal requirements can be met with lower costs for the three-way catalytic converter.

A embodiment is distinguished in that a lambda signal from a pre-controlling of the fuel/air mixture composition of the internal combustion engine is used as replacement signal for the signal of the first exhaust gas probe.

For this pre-controlling, as a rule the engine controlling specifies a lambda signal that results from the intake air quantity and the injected fuel quantity, or that helps determine these quantities. Given an appropriate pre-controlling, this lambda signal is a good approximation for the signal of the first exhaust gas probe, and has the advantage that it is available even at low temperatures.

A further embodiment is distinguished in that a lambda target value is specified for a first control loop by the lambda target value pre-controlling, and that this pre-controlling is set up to convert an initial value for the lambda target value into a fictitious fill level, through a second system model identical to the first system model, to compare the fictitious fill level with a target value for the fill level, outputted by a target value generator, and to iteratively modify the target lambda value as a function of the result of the comparison if the comparison shows a difference between the target value for the fill level and the fictitious fill level that is greater than a specified amount, and not to modify the lambda target value if the comparison shows no difference between the target value for the fill level and the fictitious fill level.

It also may be provided that a deviation of the actual fill level from the prespecified target fill level is ascertained, and, through a fill level control, is processed to form a lambda target value correction value, a sum is formed from the lambda target value and the lambda target value correction value, and the sum is used to form a correction value that is used to influence a metering of fuel to at least one combustion chamber of the internal combustion engine.

It also may be provided that that the exhaust gas component is oxygen, and that in the first control loop a lambda control takes place in which the signal from the first exhaust gas probe is processed as lambda actual value, and that the lambda target value is formed in the second control loop, and a fill level control deviation, as deviation of the fill level modeled using the first catalytic converter model, from the filtered fill level target value is formed, and this fill level control deviation is supplied to a fill level control algorithm, which forms therefrom a lambda target value correction value, and this lambda target value correction value is added to the lambda target value, which may be iteratively modified, and the sum calculated in this way forms the lambda target value.

It also may be provided that the first system model contains a catalytic converter model.

Here, a system model is understood as an algorithm that combines input variables that also act on the real object modeled by the system model to form output variables in such a way that the calculated output variables correspond as accurately as possible to the output variables of the real object. In the case under consideration, the real object is the entire physical system between the input variables and the output variables.

In addition, it may be that the first catalytic converter model has an input emissions model, a fill level model, and an emissions model.

A further embodiment is distinguished in that the first catalytic converter model has sub-models, each of which is assigned to a sub-volume of the real three-way catalytic converter.

It is further that the catalytic converter model has an output lambda model that is set up to convert, with the aid of the first catalytic converter model, calculated concentrations of the individual exhaust gas components into a signal that can be compared to the signal of a second exhaust gas probe that is situated downstream from the catalytic converter and is exposed to the exhaust gas.

A further embodiment is distinguished in that the signal calculated using the emissions model is compared with the signal measured by this further exhaust gas probe.

This comparison makes it possible to compensate inaccuracies of measurement or modeling variables that enter into the system model.

It also may be provided that the prespecified target value is between 10% and 50%, in particular between 25% and 35%, of the maximum oxygen storage capacity of the three-way catalytic converter.

With regard to embodiments of the control device, it may be provided that it is set up to control a sequence of a method according to one of the embodiments of the method.

Further advantages result from the description and from the accompanying Figures.

It will be understood that the features named above and explained in the following may be used not only in the respectively indicated combination, but also in other combinations, or by themselves, without departing from the scope of the present invention.

Exemplary embodiments of the present invention are shown in the drawing and are explained in more detail in the following description. In the various Figures, identical reference characters designate elements that are identical or at least comparable with regard to their function.

DETAILED DESCRIPTION

In the following, the present invention is described using the example of a three-way catalytic converter, and oxygen as the exhaust gas component to be stored. However, the present invention can also be appropriately transferred to other catalytic converter types and other exhaust gas components, such as nitrogen oxides and hydrocarbons. In the following, for simplicity an exhaust gas system having one three-way catalytic converter is assumed. The present invention can also be appropriately transferred to exhaust gas systems having a plurality of catalytic converters. The front and rear zones described in the following may in this case extend over a plurality of catalytic converters, or may be situated in different catalytic converters.

Figure 1:
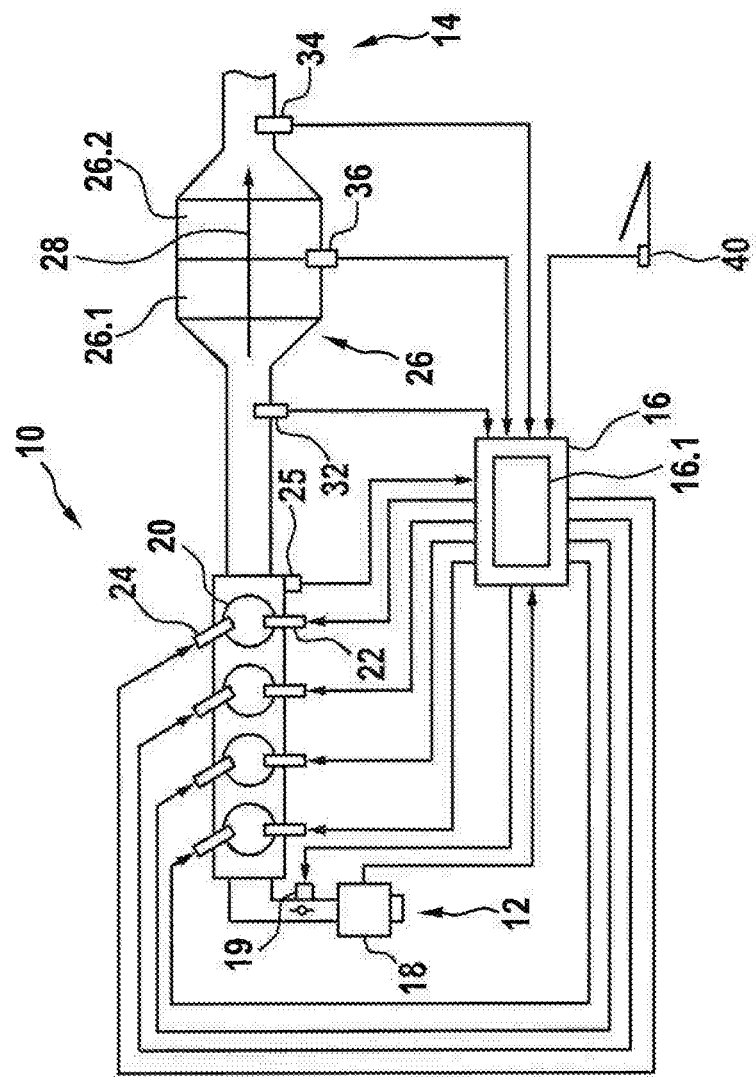
FIG. 1 shows an internal combustion engine having an exhaust gas system as technical area of the present invention.

FIG. 1 shows an internal combustion engine 10 having an air supply system 12, an exhaust gas system 14, and a control device 16. In air supply system 12 there are situated an air mass meter 18 and, situated downward from air mass meter 18, a throttle valve of a throttle valve unit 19. The air flowing into internal combustion engine 10 via air supply system 12 is mixed with fuel in combustion chambers 20 of internal combustion engine 10, the fuel being injected directly into combustion chambers 20 via injection valves 22. The present invention is not limited to internal combustion engines having direct injection, and can also be used with intake manifold injection or internal combustion engines operated with gas. The resulting combustion chamber fillings are ignited and combusted using ignition devices 24, for example spark plugs. An angle-of-rotation sensor 25 acquires the angle of rotation of a shaft of internal combustion engine 10, and in this way permits control device 16 to initiate the ignitions at specified angular positions of the shaft. The exhaust gas resulting from the combustions is discharged through exhaust gas system 14.

Exhaust gas system 14 has a catalytic converter 26. Catalytic converter 26 is for example a three-way catalytic converter that, in a known manner, converts the three exhaust gas components nitrogen oxides, hydrocarbons, and carbon monoxide along three reaction paths, and has an oxygen-storing effect. Due to the oxygen-storing effect, and because oxygen is an exhaust gas component, the catalytic converter has an exhaust gas component storage device. In the example shown, three-way catalytic converter 26 has a first zone 26.1 and a second zone 26.2. Exhaust gas 28 flows through both zones. The first, front zone 26.1 extends, in the direction of flow, over a front region of three-way catalytic converter 26. Second, rear zone 26.2 extends downstream from first zone 26.1, over a rear region of three-way catalytic converter 26. Of course, further zones may be situated before front zone 26.1 and after rear zone 26.2, as well as between the two zones, for which, if warranted, the respective filling level is also modeled using a computing model.

Upstream from three-way catalytic converter 26, a front exhaust gas probe 32, exposed to exhaust gas 28, is situated immediately before three-way catalytic converter 26. Downstream from three-way catalytic converter 26, a rear exhaust gas probe 34, also exposed to exhaust gas 28, is situated immediately after three-way catalytic converter 26. Front exhaust gas probe 32 may be a broadband lambda probe that permits a measurement of the air ratio $\lambda$ over a broad air ratio range. Rear exhaust gas probe 34 may be a so-called two-step lambda probe with which the air ratio $\lambda=1$ can be measured particularly accurately, because the signal of this exhaust gas probe 34 changes discontinuously there. (See Bosch, *Kraftfahrtechnisches Taschenbuch,* 23rd ed., p. 524.)

In the exemplary embodiment shown, a temperature sensor 36 exposed to exhaust gas 28 is situated on three-way catalytic converter 26 so as to be in thermal contact with exhaust gas 28, and the sensor acquires the temperature of three-way catalytic converter 26.

Control device 16 processes the signals of air mass meter 18, angle-of-rotation sensor 25, front exhaust gas probe 32, rear exhaust gas probe 34, and temperature sensor 36, and from these forms control signals for setting the angular position of the throttle valve, for the initiation of ignitions by ignition device 24, and for injecting fuel through injection valves 22. Alternatively or in addition, control device 16 also processes signals of other, or further, sensors for controlling the depicted actuating elements, or also further or other actuating elements, for example the signal of a sensor 40 that indicates the driver's wish, which acquires a position of an accelerator pedal. Overrun operation, with shutoff of the fuel supply, is initiated for example by releasing the accelerator pedal. These functions, and the functions further explained in the following, are carried out by an engine control program 16.1 that runs in control device 16 during operation of internal combustion engine 10.

In the present application, reference is made to a system model 100, a catalytic converter model 102, an inverse catalytic converter model 104 (cf. FIG. 3), and an output lambda model 106. Each of the models are algorithms, in particular systems of equations, that are executed, or calculated, in control device 16 and that link the input variables, which also act on the real object modeled by the computing model, to output variables in such a way that the output variables calculated by the algorithms correspond as accurately as possible to the output variables of the real object.

Figure 2:
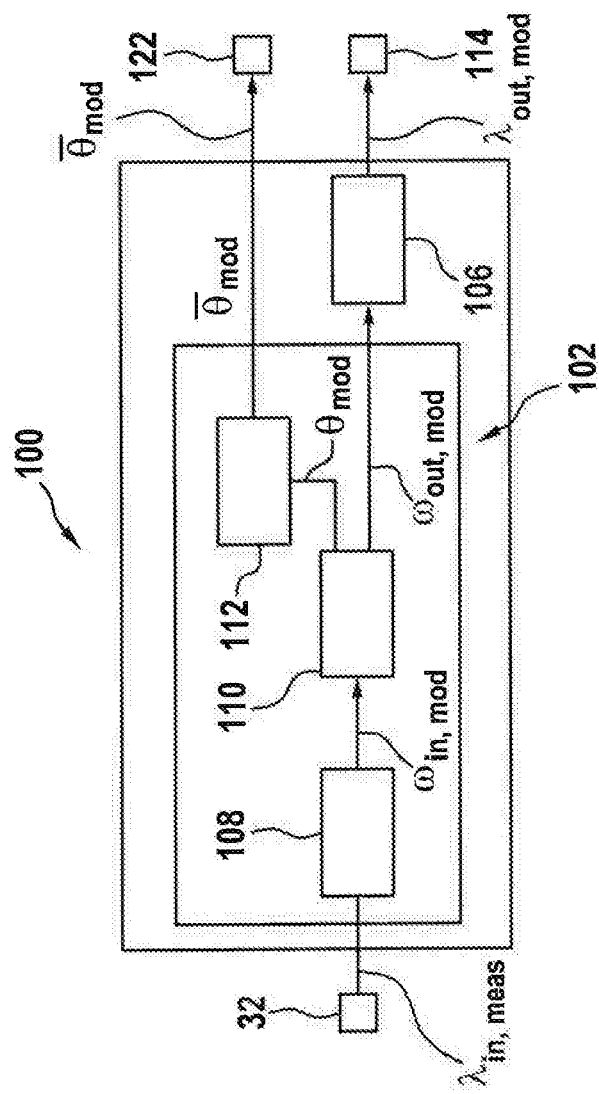
FIG. 2 shows a functional block representation of a system model.

FIG. 2 shows a functional block representation of a system model 100. System model 100 is made up of catalytic converter model 102 and output lambda model 106. Catalytic converter model 102 has an input emissions model 108 and a fill level and output emissions model 110. In addition, catalytic converter model 102 has an algorithm 112 for calculating an average fill level $\bar{\theta}_{mod}$ of catalytic converter 26.

Input emissions model 108 is set up to convert, as input variable, the signal $\lambda_{in,meas}$ of exhaust gas probe 32 situated before three-way catalytic converter 26 into input variables $w_{in,mod}$ required for the subsequent fill level and output emissions model 110. For example, a conversion of lambda into the concentrations of $O_2$, $CO$, $H_2$, and $HC$ before three-way catalytic converter 26, using input emissions model 108, is advantageous.

Using the variables $w_{in,mod}$ calculated by input emissions model 108, and, if warranted, additional input variables (e.g. exhaust gas or catalytic converter temperatures, exhaust gas mass flow, and current maximum oxygen storage capacity of three-way catalytic converter 26), in fill level and output emissions model 110 a fill level $\theta_{mod}$ of three-way catalytic converter 26 and concentrations $w_{out,mod}$ of the individual exhaust gas components at the output of three-way catalytic converter 26 are modeled.

In order to enable realistic modeling of filling and emptying processes, the algorithm may make imaginary divisions of three-way catalytic converter 26 into a plurality of zones or partial volumes 26.1, 26.2, situated one after the other in the direction of flow of the exhaust gases 28, and the concentrations of the individual exhaust gas components are ascertained with the aid of the reaction kinetics for each of these zones 26.1, 26.2. These concentrations can in turn each be converted into a fill level of the individual zones 26.1, 26.2, which may be into the oxygen fill level normed to the current maximum oxygen storage capacity.

Using a suitable weighting, the fill levels of individual, or of all, zones 26.1 26.2 can be combined to form an overall fill level that reflects the state of three-way catalytic converter 26. For example, in the simplest case the fill levels of all zones 26.1, 26.2 can all be equally weighted, and an average fill level thus ascertained. With a suitable weighting, however, it can also be taken into account that for the instantaneous exhaust gas composition after three-way catalytic converter 26, the fill level in a comparatively small zone 26.2 at the output of three-way catalytic converter 26 is decisive, while for the development of the fill level in this small zone 26.2 at the output of three-way catalytic converter 26, the fill level in the zone 26.1 situated before it, and its development, is decisive. For simplicity, in the following an average oxygen fill level is assumed.

The algorithm of the output lambda model 106 converts the concentrations $w_{out,mod}$ of the individual exhaust gas components at the output of catalytic converter 26 for the adaptation of system model 100 into a signal $\lambda_{out,mod}$ that can be compared to the signal $\lambda_{out,meas}$ of exhaust gas probe 34 situated after catalytic converter 26. The lambda after three-way catalytic converter 26 may be modeled. Output lambda model 106 is not necessarily required for a pre-controlling on the basis of a target oxygen fill level.

System model 100 is thus used on one hand for the modeling of at least one average fill level $\bar{\theta}_{mod}$ of catalytic converter 26, which is controlled to a target fill level, in which catalytic converter 26 is reliably situated within the catalytic converter window. On the other hand, system model 100 provides a modeled signal $\lambda_{out,mod}$ of exhaust gas probe 34 situated after catalytic converter 26. Below, it is further explained how this modeled signal $\lambda_{out,mod}$ of rear exhaust gas probe 34 is advantageously used for the adaptation of system model 100. The adaptation is done for the compensation of uncertainty in the input variables of the system model, in particular the signal of the lambda probe before the catalytic converter. The pre-controlling and, if warranted, control parameters are also adapted.

Figure 3:
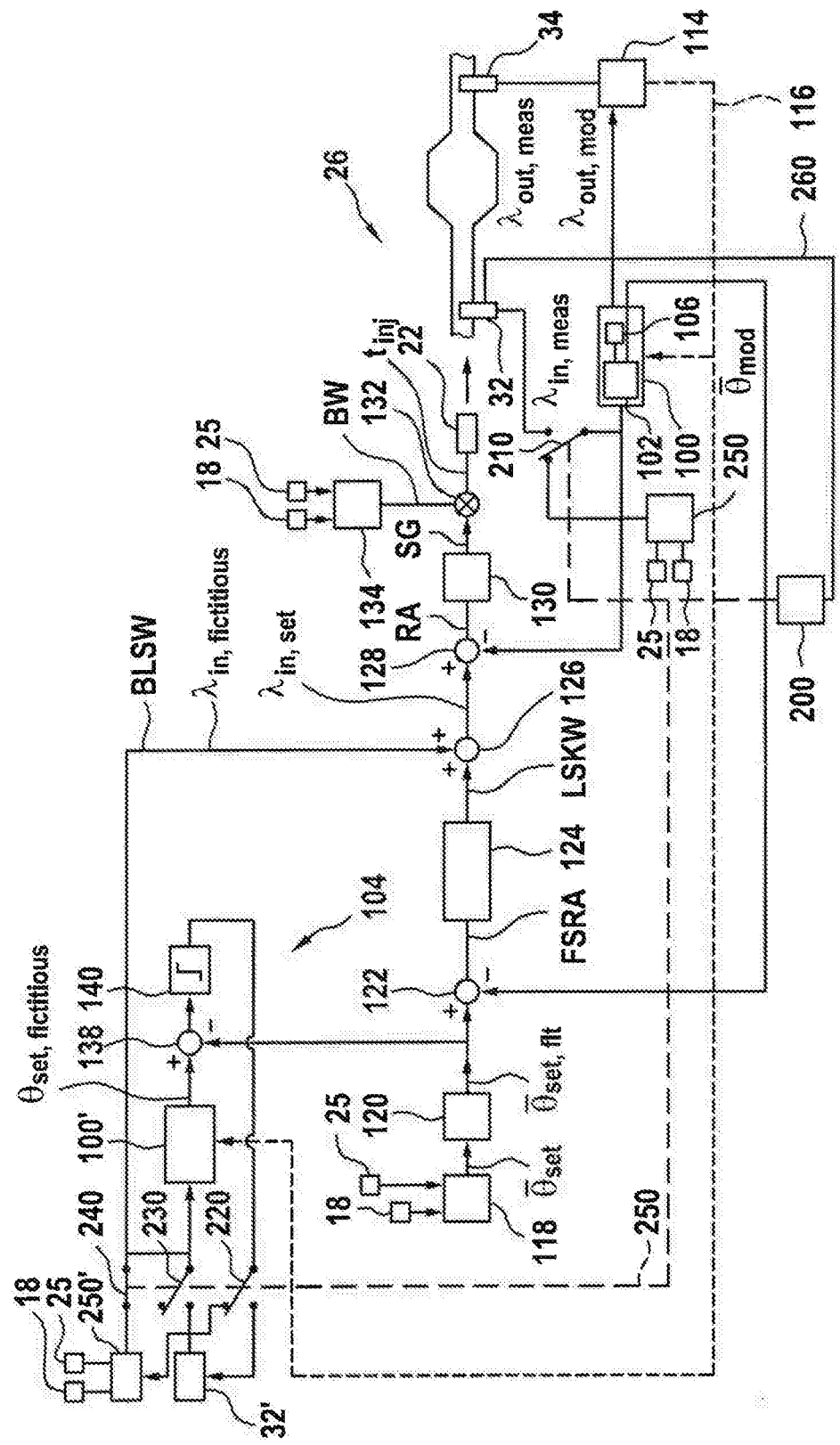
FIG. 3 shows a functional block representation of an exemplary embodiment of a method and control device according to the present invention.

FIG. 3 shows a functional block representation of an exemplary embodiment of a method and control device according to the present invention. FIG. 3 shows, in particular, an operational readiness recognition unit 200 for first exhaust gas probe 32, various switches 210, 220, 230, and 240 with which connections between functional blocks are closed and opened, and a signal path 250 via which switches 210, 220, 230, and 240 are simultaneously activated. These switches 210, 220, 230, and 240 represent an activation and deactivation of functions, and therefore need not necessarily be realized as physical switches.

The following explanation relates first to a state in which switch 210 closes the connection between first exhaust gas probe 32 and system model 100, switch 220 connects block 140 to block 32', switch 230 connects block 32' to block 100' and gate 126, and switch 240 is open. This state results when first exhaust gas probe 32 is ready for operation.

FIG. 3 shows the alternative switching state that results when first exhaust gas probe 32 is not ready for operation. In this case, in which the first exhaust gas probe is not ready for operation, the operational readiness recognition unit 200 actuates switches 210, 220, 230, and 240 in such a way that switch 210 separates system model 100 from first exhaust gas probe 32 and connects it to replacement signal generator 250, switch 220 connects the output of block 140 to lambda actual value sensor block 32', switch 230 separates lambda actual value sensor block 32' from system model 100' and gate 126, and switch 240 connects replacement signal generator 250' to system model 100' and gate 126.

Operational readiness recognition unit 200 for first exhaust gas probe 32 evaluates, for example, a temperature-dependent internal resistance and/or signals produced by first exhaust gas probe 32. For this purpose, operational readiness recognition unit 200 is connected to first exhaust gas probe 32 via a connection 260.

FIG. 3 shows how the signal $\lambda_{out,mod}$ of rear exhaust gas probe 34, modeled by output lambda model 106 of system model 100, is adjusted to the real output signal $\lambda_{out,meas}$ of rear exhaust gas probe 34. For this purpose, the two signals $\lambda_{out,mod}$ and $\lambda_{out,meas}$ are supplied to an adaptation block 114. Adaptation block 114 compares the two signals $\lambda_{out,mod}$ and $\lambda_{out,meas}$ to one another. For example, a two-step lambda probe situated after three-way catalytic converter 26, as exhaust gas probe 34, clearly indicates when three-way catalytic converter 26 is completely filled with oxygen or is completely emptied of oxygen. This can be used after lean or rich phases to bring the modeled oxygen fill level into agreement with the actual oxygen fill level, or to bring the modeled output lambda $\lambda_{out,mod}$ into agreement with the lambda $\lambda_{out,meas}$ measured after three-way catalytic converter 26, and to adapt system model 100 in the case of deviations. The adaptation takes place for example in that adaptation block 114 successively changes parameters of the algorithm of system model 100, via the adaptation path 116 shown in broken lines, until the lambda value $\lambda_{out,mod}$ modeled for the exhaust gas flowing out from three-way catalytic converter 26 corresponds to the lambda value $\lambda_{out,meas}$ measured there.

In this way, inaccuracies in measured variables or modeling variables that go into system model 100 are compensated. From the fact that the modeled value $\lambda_{out,mod}$ corresponds to the measured lambda value $\lambda_{out,meas}$, it can be inferred that the fill level $\overline{\theta}_{mod}$ modeled with system model 100, or with first catalytic converter model 102, corresponds to the fill level of three-way catalytic converter 26, which is not measurable by an apparatus/device available on board. It can then be further inferred that the second catalytic converter model 104, which is the inverse of the first catalytic converter model 102, and which results from the algorithm of the first catalytic converter model 102 through mathematical transformations, also correctly describes the behavior of the modeled system.

This can be used to calculate a lambda target value, using the pre-controlling 104, realized as inverse second catalytic converter model. For this purpose, a fill level target value $\overline{\theta}_{set,fit}$, filtered through an optional filtering 120, is supplied to inverse second catalytic converter model 104 as input variable. Filtering 120 is done with the purpose of permitting only those modifications of the input variable of inverse second catalytic converter model 104 that the controlled system as a whole can follow. A still-unfiltered target value $\overline{\theta}_{set}$ is read out from a memory 118 of control device 16. For this purpose, memory 118 may be addressed with current operating characteristic variables of internal combustion engine 10. The operating characteristic variables can be for example, but are not necessarily, the rotational speed, acquired by rotational speed sensor 25, and the load of internal combustion engine 10, acquired by air mass meter 18.

The filtered fill level target value $\overline{\theta}_{set,fit}$ is processed with the inverse second catalytic converter model 104 to form a base lambda target value BLSW. Parallel to this processing, in a gate 122 a fill level control deviation FSRA is formed as deviation of the fill level $\overline{\theta}_{mod}$, modeled with system model 100 or with first catalytic converter model 102, from the filtered fill level target value $\overline{\theta}_{set,fit}$. This fill level control deviation FSRA is supplied to a fill level control algorithm 124, which forms therefrom a lambda target value correction value LSKW. This lambda target value correction value LSKW is added, in gate 126, to the base lambda target value BLSW calculated by inverse system model 104.

The sum formed in this way can be used as lambda target value $\lambda_{in,set}$ of a conventional lambda control. Under the assumption of a first exhaust gas probe 32 that is ready for operation, the lambda actual value $\lambda_{in,meas}$ provided by first exhaust gas probe 32 is subtracted from this lambda target value $\lambda_{in,set}$ in a gate 128. The control deviation RA formed in this way is converted by a standard control algorithm 130 into an actuating variable SG that is gated, in a gate 132, for example in a multiplicative manner, with a base value BW, predetermined as a function of operating parameters of internal combustion engine 10, of an injection pulse width $t_{inj}$. The base values BW are stored in a memory 134 of control device 16. Here as well, the operating parameters may be, but not necessarily, the load and the rotational speed of internal combustion engine 10. Using the injection pulse width $t_{inj}$ resulting from the product, fuel is injected into the combustion chambers 20 of internal combustion engine 10 via injection valves 22.

In this way, a control of the oxygen fill level of catalytic converter 26, taking place in a second control loop, is superposed on the conventional lambda control taking place in a first control loop. Here, the average oxygen fill level $\overline{\theta}_{mod}$ modeled using the system model 100, or using first catalytic converter model 102, is controlled for example to a target value $\overline{\theta}_{set,fit}$ that minimizes the probability of breakdowns according to lean and rich, and thus results in minimal emissions. Because the base lambda target value BLSW is here formed by the inverted second system model 104, the control deviation of the fill level control is equal to zero if the modeled average fill level $\overline{\theta}_{mod}$ is identical to the pre-filtered target fill level $\overline{\theta}_{set,fit}$. Fill level control algorithm 124 engages only if this is not the case. Because the formation of the base lambda target value, acting so to speak as the pre-controlling of the fill level control, is realized as inverted second catalytic converter model 104 of first catalytic converter model 102, this pre-controlling can be adapted analogously to the adaptation of first catalytic converter model 102 on the basis of the signal $\lambda_{in,meas}$ of the second exhaust gas probe 34 situated after three-way catalytic converter 26. This is illustrated in FIG. 3 by the branch of adaptation path 116 leading to the inverted system model 104.

This realization of the pre-controlling as inversion of the system model has the advantage that the fill level control algorithm 124 has to engage only when the actual fill level of the catalytic converter, modeled using the system model, differs from the filtered fill level target value $\overline{\theta}_{set,fit}$ or from the unfiltered fill level target value $\overline{\theta}_{set}$. While system model 100 converts the input lambda before the catalytic converter into an average oxygen fill level of the catalytic converter, the pre-controlling, realized as inverted system model 104, converts the average target oxygen fill level into a corresponding target lambda before the catalytic converter.

The pre-controlling 104, realized as inverted system model, can be an element that exists analytically, i.e. an element that exists in the form of a system of equations and is inverse to system model 100. However, a catalytic converter is a complex, nonlinear system having time-variant system parameters that, as a rule, can be represented only by a nonlinear system of differential equations. This typically has the result that the system of equations for the pre-controlling 104 realized as an inverted system model cannot be solved analytically.

These solubility problems are avoided in that pre-controlling 104 is replaced not by an analytic, inverted system model, but rather by a numerically inverted computing model that is based on a first system model 100, assumed to be known, for catalytic converter 26. The pre-controlling 104 has a second system model 100' whose system of equations is identical to the equation system of first system model 100, but is supplied with different input variables.

The present invention is based on the following consideration. Using a lambda actual value generator block 32', a fictitious value $\zeta_{in,fictitious}$ is specified as initial input variable for second system model 100' of pre-controlling 136. If first exhaust gas probe 32 is ready for operation, this is for example a current signal of first exhaust gas probe 32. Using second system model 100', from this input variable there results a fictitious value $\overline{\theta}_{set,fictitious}$ for the average oxygen fill level of catalytic converter 26. In gate 138, the difference is calculated of fictitious average fill level $\overline{\theta}_{set,fictitious}$ and the fill level target value $\overline{\theta}_{set,fit}$ filtered by the optional filtering 120, or the unfiltered fill level target value $\overline{\theta}_{set}$. If the two values $\overline{\theta}_{set,fictitious}$ and $\overline{\theta}_{set,fit}$ (or $\overline{\theta}_{set}$) are equal, the difference is equal to zero. This means that the specified fictitious lambda value $\lambda_{in,fictitious}$ corresponds precisely to that lambda target value BLSW that has to be preset in order to reach the target oxygen fill level. In threshold value block 140, the difference between fictitious average fill level $\overline{\theta}_{set,fictitious}$ and the fill level target value $\overline{\theta}_{set,fit}$ filtered by the optional filtering 120, or the unfiltered fill level target value $\overline{\theta}_{set}$, is compared to a specified threshold value. If the amount of the difference is small enough, which can be set by choosing the magnitude of the threshold value, then threshold value block 140 provides a signal representing this fact to lambda actual value generator block 32'. In reaction to this signal, lambda actual value generator block 32' maintains its output signal $\lambda_{in,fictitious}$, which is thus recognized as correct, and supplies this signal to gate 126 as base lambda target value BLSW.

In contrast, if the difference between fictitious average fill level $\overline{\theta}_{set,fictitious}$ and the fill level target value $\overline{\theta}_{set,fit}$ filtered by the optional filtering 120, or the unfiltered fill level target value $\overline{\theta}_{set}$, is greater than the threshold value, this means that the specified fictitious lambda value Ain, fictitious does not yet correspond to the ideal lambda target value BLSW that has to be preset in order to reach the target oxygen fill level. In threshold value block 140, the difference between fictitious average fill level $\overline{\theta}_{set,fictitious}$ and the fill level target value $\overline{\theta}_{set,fit}$ filtered by the optional filtering 120, or the unfiltered fill level target value $\overline{\theta}_{set}$, will then exceed the specified threshold value. In this case, threshold value block 140 provides a signal representing this fact to lambda actual value generator block 32'. In reaction to this signal, lambda actual value generator block 32' begins to iteratively vary its output signal $\lambda_{in,fictitious}$, which has thus been recognized as incorrect, and supplies the iteratively varying output signal Ain, fictitious in particular to system model 100'. This system model 100', which is the second model relative to first system model 100, is then iterated with variable input lambda $\lambda_{in,fictitious}$, with the same parameters and initially the same state variables as first system model 100, until the difference between fictitious average fill level $\overline{\theta}_{set,fictitious}$ calculated by the second system model 100' and the filtered fill level target value $\overline{\theta}_{set,fit}$ or the unfiltered fill level target value $\overline{\theta}_{set}$ is small enough in its magnitude to reach the required precision of the pre-controlling. The required precision can be set via the choice of the threshold value in block 140. The value found in this way for input lambda $\lambda_{in,fictitious}$ is then used as base lambda target value BLSW for the first control loop. The difference formation is only one embodiment of a comparison of fictitious average fill level $\overline{\theta}_{set,fictitious}$ with fill level target value $\overline{\theta}_{set,fit}$ filtered by the optional filtering 120, or with the unfiltered fill level target value $\overline{\theta}_{set}$. A comparison can for example also take place on the basis of a quotient formation.

The advantage of this procedure is that only the equation system for the forward system model 100, or 100', has to be solved another time, but not the equation system for backward system model 104 of FIG. 3, which is insoluble or can be solved only with a high computing expense.

In order to minimize the computing expense in control device 16, which may be iteration limits are defined for input lambda $\lambda_{in,fictitious}$ that determine the range in which the iteration is carried out. These iteration limits may be defined as a function of the current operating conditions. For example, it is advantageous to carry out the iteration only in as small as possible an interval around the expected target lambda BLSW. In addition, in the definition of the iteration limits it is advantageous to take into account the action of the fill level control 124, and actions by other functionalities, on the target lambda BLSW.

The equation system to be solved is solved iteratively within this interval using bracketing methods, such as bisection methods or regula falsi. Bracketing methods such as regula falsi are generally known. They are distinguished in that they do not only supply iterative approximation values, but also limit these values from both sides. The computing expense for determining the correct base lambda target value BLSW is significantly limited in this way.

With the exception of exhaust gas system 26, exhaust gas probes 32, 34, air mass meter 18, angle-of-rotation sensor 25, and injection valves 22, all elements shown in FIG. 4 are components of a control device 16 according to the present invention. With the exception of storage devices 118, 134, all other elements of FIG. 4 are parts of engine control program 16.1, which is stored in control device 16 and runs therein.

Elements 22, 32, 128, 130, and 132 form the first control loop in which a lambda control takes place, in which the signal $\lambda_{in,meas}$ of the first exhaust gas probe (32) is processed as lambda actual value. Lambda target value $\lambda_{in,set}$ of the first control loop is formed in the second control loop, which has elements 22, 32, 100, 122, 124, 126, 128, 132.

If the first exhaust gas probe is not ready for operation, operational readiness recognition unit 200 switches off the formation of the lambda target value, which takes place as a function of the signal of the first exhaust gas probe 32, and activates a formation of the lambda target value as a function of a replacement signal.

FIG. 3 illustrates this change in the formation of the lambda target value in that operational readiness recognition unit 200 switches the switches 210, 220, 230, and 240 to the switching position shown in FIG. 3. Block 250 represents a replacement signal generator. The replacement signal may be a lambda signal that results from current values for the intake air quantity and the fuel quantity allocated thereto by a mixture pre-controlling unit. Such a lambda signal is present in the engine controlling as target value for the mixture pre-controlling, or can be produced from data that are in the engine controlling unit. The lambda signal is, as a rule, produced as a function of the intake air quantity and the rotational speed, provided by sensors 18 and 25. The formation of the lambda target value as a function of the replacement signal results in the switching position, shown in FIG. 3, of switches 210, 220, 230, and 240. In the depicted switching position of switch 210, the replacement signal from replacement signal generator 250' is supplied to system model 100 instead of the signal of first exhaust gas probe 32. In an embodiment, replacement signal generator 250' works analogously to the manner of operation of actual value generator block 32'; that is, in particular it iterates in the same way as actual value generator block 32'. In an alternative embodiment, replacement signal generator 250' does not iterate. This is justifiable because the time span in which replacement signal generator 250' is active is, as a rule, limited to the short time span after a start during which the front exhaust gas probe is not yet ready for operation.

What is claimed is:

1. A method for controlling a filling of an exhaust gas component storage device of a catalytic converter in exhaust gas of an internal combustion engine, the method comprising:

ascertaining an actual fill level of the exhaust gas component storage device using a first system model, to which a signal of a first exhaust gas probe that extends into an exhaust gas stream upstream from the catalytic converter and acquires a concentration of an exhaust gas component are supplied when the first exhaust gas probe is ready for operation;

specifying a lambda target value for a first control loop by a lambda target value pilot control;

supplying, when the first exhaust gas probe is not ready for operation, a replacement signal for the signal of the first exhaust gas probe to the first system model; and
using the replacement signal in the lambda target value pilot control as an initial value for the lambda target value;
wherein the lambda target value for the first control loop is specified by the lambda target value pilot control, and the lambda target value pilot control is set up to convert the initial value for the lambda target value into a fictitious fill level using a second system model identical to the first system model, to compare the fictitious fill level to a target value for a target fill level outputted by a target value generator, and to iteratively change the lambda target value as a function of the result of the comparison if the result of the comparison shows a difference between the target value for the target fill level and the fictitious fill level that is greater than a specified measure, and not to change the lambda target value if the result of the comparison shows no difference between the target value for the target fill level and the fictitious fill level.

2. The method of claim 1, wherein a deviation of the actual fill level from the target fill level is ascertained, and, through a fill level control, is processed to form a lambda target value correction value, a sum is formed of a base lambda target value and the lambda target value correction value, and the sum is used to form a correction value that is used to influence a metering of fuel to at least one combustion chamber of the internal combustion engine.

3. The method of claim 1, wherein the target value for the fill level is between 10% and 50% of a maximum oxygen storage capacity of the catalytic converter.

4. The method of claim 1, wherein the target value for the fill level is between 25% and 35% of a maximum oxygen storage capacity of the catalytic converter.

5. A method for controlling a filling of an exhaust gas component storage device of a catalytic converter in exhaust gas of an internal combustion engine, the method comprising:
ascertaining an actual fill level of the exhaust gas component storage device using a first system model, to which a signal of a first exhaust gas probe that extends into an exhaust gas stream upstream from the catalytic converter and acquires a concentration of an exhaust gas component are supplied when the first exhaust gas probe is ready for operation;
specifying a lambda target value for a first control loop by a lambda target value pilot control;
supplying, when the first exhaust gas probe is not ready for operation, a replacement signal for the signal of the first exhaust gas probe to the first system model; and
using the replacement signal in the lambda target value pilot control as an initial value for the lambda target value;
wherein the exhaust gas component is oxygen, and in the first control loop, a lambda control takes place in which the signal of the first exhaust gas probe is processed as a lambda actual value, and the lambda target value is formed in a second control loop, a fill level control deviation being formed as deviation of the actual fill level modeled with the first system model from a filtered fill level target value, the fill level control deviation being supplied to a fill level control algorithm that forms a lambda target value correction value therefrom, and the lambda target value correction value being added to the base lambda target value, iteratively changed if warranted, the sum calculated in this way forming the lambda target value.

6. A method for controlling a filling of an exhaust gas component storage device of a catalytic converter in exhaust gas of an internal combustion engine, the method comprising:
ascertaining an actual fill level of the exhaust gas component storage device using a first system model, to which a signal of a first exhaust gas probe that extends into an exhaust gas stream upstream from the catalytic converter and acquires a concentration of an exhaust gas component are supplied when the first exhaust gas probe is ready for operation;
specifying a lambda target value for a first control loop by a lambda target value pilot control;
supplying, when the first exhaust gas probe is not ready for operation, a replacement signal for the signal of the first exhaust gas probe to the first system model; and
using the replacement signal in the lambda target value pilot control as an initial value for the lambda target value;
wherein the first system model includes a catalytic converter model;
wherein the catalytic converter model includes an input emissions model and a fill level and emissions model;
wherein the catalytic converter model includes sub-models, each of which is assigned to a sub-volume of the catalytic converter.

7. The method of claim 6, wherein a lambda signal from a pilot control of a fuel/air mixture composition of the internal combustion engine is used as the replacement signal for the signal of the first exhaust gas probe.

8. The method of claim 6, wherein the catalytic converter model includes an output lambda model that is set up to convert, with the catalytic converter model, calculated concentrations of individual exhaust gas components into a signal that can be compared with a signal of a second exhaust gas probe that is situated downstream from the catalytic converter and is exposed to the exhaust gas.

9. The method of claim 8, wherein the signal calculated with the output lambda model is calibrated with the signal measured by the second exhaust gas probe.

10. The method of claim 8, wherein parameters of the first system model are successively modified until a modeled lambda value modeled by the first system model for the exhaust gas flowing out from the three-way catalytic converter corresponds to a measured lambda value measured for the exhaust gas flowing out from the three-way catalytic converter.

11. A control apparatus, comprising:
a control device configured to control a filling of an exhaust gas component storage device of a catalytic converter in exhaust gas of an internal combustion engine, and to ascertain an actual fill level of the exhaust gas component storage device using a first system model, and to process a signal of a first exhaust gas probe that extends into an exhaust gas stream upstream from the catalytic converter and that acquires a concentration of an exhaust gas component, when the first exhaust gas probe is ready for operation;
wherein the control device is configured to specify a lambda target value for a first control loop through a lambda target value pilot control, and, if the first exhaust gas probe is not ready for operation, to supply a replacement signal for the signal of the first exhaust gas probe to the first system model, and to use the replacement signal in the lambda target value pilot control as an initial value for the lambda target value;

wherein the first system model includes a catalytic converter model;

wherein the catalytic converter model includes an input emissions model and a fill level and emissions model;

wherein the catalytic converter model includes sub-models, each of which is assigned to a sub-volume of the catalytic converter.

12. The control device of claim 11, wherein a lambda signal from a pilot control of a fuel/air mixture composition of the internal combustion engine is used as the replacement signal for the signal of the first exhaust gas probe.

* * * * *